US008555240B2

(12) United States Patent
Bouillet et al.

(10) Patent No.: US 8,555,240 B2
(45) Date of Patent: Oct. 8, 2013

(54) DESCRIBING FORMAL END-USER REQUIREMENTS IN INFORMATION PROCESSING SYSTEMS USING A FACETED, TAG-BASED MODEL

(75) Inventors: Eric Bouillet, Englewood, NJ (US); Mark D. Feblowitz, Winchester, MA (US); Zhen Liu, Tarrytown, NY (US); Anand Ranganathan, Stamford, CT (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 12/252,132

(22) Filed: Oct. 15, 2008

(65) Prior Publication Data

US 2010/0095267 A1 Apr. 15, 2010

(51) Int. Cl.
*G06F 9/44* (2006.01)

(52) U.S. Cl.
USPC .......................................................... 717/101

(58) Field of Classification Search
None
See application file for complete search history.

(56) References Cited

U.S. PATENT DOCUMENTS

| | | | | | |
|---|---|---|---|---|---|
| 4,821,211 | A | * | 4/1989 | Torres | 715/853 |
| 6,401,096 | B1 | * | 6/2002 | Zellweger | 707/702 |
| 7,334,216 | B2 | * | 2/2008 | Molina-Moreno et al. | 717/109 |
| 7,360,175 | B2 | * | 4/2008 | Gardner et al. | 715/854 |
| 7,502,799 | B2 | * | 3/2009 | Ohmori et al. | 1/1 |
| 7,548,917 | B2 | * | 6/2009 | Nelson | 1/1 |
| 7,600,188 | B2 | * | 10/2009 | Good et al. | 715/762 |
| 7,730,447 | B2 | | 6/2010 | Ringseth et al. | |
| 7,792,836 | B2 | | 9/2010 | Taswell | |
| 7,793,268 | B2 | | 9/2010 | Wassel et al. | |
| 7,802,230 | B1 | * | 9/2010 | Mendicino et al. | 717/113 |
| 7,908,584 | B2 | | 3/2011 | Singh et al. | |
| 7,933,914 | B2 | * | 4/2011 | Ramsey et al. | 707/760 |
| 8,161,036 | B2 | * | 4/2012 | Tankovich et al. | 707/715 |
| 8,175,936 | B2 | * | 5/2012 | Ronen et al. | 705/27.2 |
| 8,185,892 | B2 | * | 5/2012 | Lucas et al. | 717/178 |
| 8,225,282 | B1 | | 7/2012 | Massoudi et al. | |
| 8,239,820 | B1 | | 8/2012 | White et al. | |
| 8,327,351 | B2 | | 12/2012 | Paladino et al. | |
| 2003/0058282 | A1 | * | 3/2003 | Sato | 345/810 |
| 2004/0059436 | A1 | * | 3/2004 | Anderson et al. | 700/2 |
| 2004/0254949 | A1 | * | 12/2004 | Amirthalingam | 707/101 |
| 2005/0108001 | A1 | * | 5/2005 | Aarskog | 704/10 |
| 2005/0166193 | A1 | | 7/2005 | Smith et al. | |
| 2005/0203764 | A1 | * | 9/2005 | Sundararajan et al. | 705/1 |

(Continued)

OTHER PUBLICATIONS

The Amulet Environment: New Models for Effective User Interface Software Development, Myers, et al., IEEE Transactions on Software Engineering, vol. 23, No. 6, June 1997.*

(Continued)

*Primary Examiner* — Don Wong
*Assistant Examiner* — Daxin Wu
(74) *Attorney, Agent, or Firm* — William J. Stock; F. Chau & Associates, LLC

(57) ABSTRACT

A method, including: providing a computer menu from which a processing goal can be created, wherein the menu includes a plurality of facets, and wherein each facet includes at least one tag; receiving a processing goal, wherein the processing goal includes a plurality of tags selected from the menu; executing at least one application that includes a plurality of components arranged in a processing graph to produce information that satisfies the processing goal; and outputting the information.

20 Claims, 4 Drawing Sheets

(56) References Cited

U.S. PATENT DOCUMENTS

| | | | |
|---|---|---|---|
| 2005/0204337 A1* | 9/2005 | Diesel et al. | 717/113 |
| 2005/0228855 A1 | 10/2005 | Kawato | |
| 2006/0242101 A1 | 10/2006 | Akkiraju et al. | |
| 2006/0248467 A1 | 11/2006 | Elvanoglu et al. | |
| 2006/0271565 A1* | 11/2006 | Acevedo-Aviles et al. | 707/100 |
| 2007/0011155 A1* | 1/2007 | Sarkar | 707/5 |
| 2007/0033590 A1 | 2/2007 | Masuouka et al. | |
| 2007/0061776 A1* | 3/2007 | Ryan et al. | 717/105 |
| 2007/0073570 A1 | 3/2007 | Montagut | |
| 2007/0174247 A1* | 7/2007 | Xu et al. | 707/3 |
| 2007/0214111 A1 | 9/2007 | Jin et al. | |
| 2008/0016072 A1* | 1/2008 | Frieden et al. | 707/7 |
| 2008/0104032 A1* | 5/2008 | Sarkar | 707/3 |
| 2008/0168420 A1 | 7/2008 | Sabbouh | |
| 2008/0189675 A1 | 8/2008 | Aupperle et al. | |
| 2008/0228851 A1 | 9/2008 | Angelov et al. | |
| 2008/0229217 A1* | 9/2008 | Kembel et al. | 715/760 |
| 2008/0229278 A1 | 9/2008 | Liu et al. | |
| 2008/0313229 A1 | 12/2008 | Taswell | |
| 2009/0037268 A1* | 2/2009 | Zaid et al. | 705/14 |
| 2009/0077124 A1* | 3/2009 | Spivack et al. | 707/103 Y |
| 2009/0094189 A1* | 4/2009 | Stephens | 707/2 |
| 2009/0100407 A1 | 4/2009 | Bouillet et al. | |
| 2009/0106080 A1* | 4/2009 | Carrier et al. | 705/10 |
| 2009/0125977 A1 | 5/2009 | Chandler et al. | |
| 2009/0144296 A1* | 6/2009 | Agrawal et al. | 707/100 |
| 2009/0150425 A1* | 6/2009 | Bedingfield, Sr. | 707/102 |
| 2009/0171708 A1* | 7/2009 | Bobak et al. | 705/7 |
| 2009/0177955 A1* | 7/2009 | Liu et al. | 715/200 |
| 2009/0177957 A1 | 7/2009 | Bouillet et al. | |
| 2009/0198668 A1* | 8/2009 | Jean Bolf et al. | 707/5 |
| 2009/0198675 A1* | 8/2009 | Mihalik et al. | 707/5 |
| 2009/0199158 A1* | 8/2009 | Bolf et al. | 717/107 |
| 2009/0241015 A1* | 9/2009 | Bender et al. | 715/202 |
| 2009/0249370 A1 | 10/2009 | Liu et al. | |
| 2009/0276753 A1 | 11/2009 | Bouillet et al. | |
| 2010/0077386 A1 | 3/2010 | Akkiraju et al. | |
| 2010/0106546 A1 | 4/2010 | Sproule | |
| 2010/0281458 A1 | 11/2010 | Paladino et al. | |
| 2011/0107273 A1 | 5/2011 | Ranganathan et al. | |
| 2011/0314439 A1 | 12/2011 | Colgrave et al. | |

OTHER PUBLICATIONS

Directed acyclic graph, Computing Dictionary, Dec. 7, 1994.*
Daniel H. Pink, "Folksonomy", The New York Times, Published: Dec. 11, 2005.*
"Folksonomy" from Wikipedia, Oct. 5, 2007.*
D. Berardi, D. Calvanese, G.D. Giacomo, R. Hull, and M. Mecella, "Automatic composition of transition-based semantic web services with messaging", In VLDB, 2005.
F. Lecue and A. Leger, "A formal model for semantic web service composition", In ISWC '06, 2006.
S. Narayanan and S. McIlraith, "Simulation, verification and automated composition of web services", In WWW, 2002.
X.T. Nguyen, R. Kowalczyk, and M.T. Phan, "Modelling and solving QoS composition problem using Fuzzy DisCSP", In ICWS, 2006.
J. Pathak, S. Basu, and V. Honavar, "Modeling web services by iterative reformulation of functional and non-functional requirements", In ICSOC, 2006.
M. Pistore et al., "Automated synthesis of composite BPEL4WS web service", In ICWS, 2005.
R. Akkiraju et al., "Semaplan: Combining planning with semantic matching to achieve web service composition", In ICWS, 2006.
R. Berbner et al., "Heuristics for Q0S-aware web service composition", In ICWS, 2006.
A. Riabov and Z. Liu, "Planning for stream processing systems", In AAAI, 2005.
M. Sheshagiri, M. desJardins, and T. Finin, "A planner for composing services described in DAML-S", In Web Services and Agent-based Engineering—AAMAS, 2003.
K. Sivashanmugam, J. Miller, A. Sheth, and K. Verma, "Framework for semantic web process composition", Special Issue of the Interl Journal of Electronic Commerce, 2003.
Liu et al., "A planning Approach for Message-Oriented Semantic Web Service Composition", 2007, Association for hte Advancement of Artificial Intelligence, pp. 1389-1394.
Qui et al., "Semantic Web Services Composition Using AI planning of Description Logics", 2006 IEEE, APSCC'06, pp. 1-8.
Zhen Liu "Zhen Liu—Nokia Research Center", pp. 1-5; downloaded Nov. 20, 2012; <research.nokia.com/people/zhen_liu>.
Rajasekaran et al., "Enhancing Web Services Description and Discovery to Facilitate Composition", 2005, Springer-Verlag, SWSWPC 2004, LNCS 3387, pp. 55-68.
Battle et al., "Semantic Web Services Language (SWSL)", W3C Member Submission, Sep. 9, 2005, W3C, pp. 1-41; <http://www.w3.org/Submission/SWSF-SWSL/>.
Bouillet et al., "A Faceted Requirements-Driven Approach to Service Design and Composition", 2008 IEEE Conference on Web Services, pp. 369-376.
Sohrabi et al., "Composition of Flow-Based Applications with HTN Planning", 2012, the 6th International Scheduling and Planning Applications woRKshop (SPARK), pp. 58-64.
Bouillet et al., "MARIO: Middleware for Assembly and Deployment of Multi-platform Flow-Based Applications", ACM, 2009 Springer-Verlag, pp. 1-7.
P. Traverso and M. Pistore, "Automated composition of semantic web services into executable processes", In ISWC'04.
Eric Bouillet, Mark Feblowitz, Hanhua Feng, Zhen Liu, Anand Ranganathan, Anton Riabov, "A Folksonomy-Based Model of Web Services for Discovery and Automatic Composition", In SCC, '08.
Eric Bouillet, Mark Feblowitz, Zhen Liu, Anand Ranganathan, Anton Riabov, "A Tag-Based Approach for the Design and Composition of Information Processing Applications", OOPSLA'08.

* cited by examiner

DESCRIBING FORMAL END-USER REQUIREMENTS IN INFORMATION PROCESSING SYSTEMS USING A FACETED, TAG-BASED MODEL

GOVERNMENT INTERESTS

This invention was made with Government support under Contract No.: H98230-07-C-0383 awarded by the U.S. Department of Defense. The Government has certain rights in this invention.

RELATED APPLICATION

This application is related to commonly assigned U.S. patent application entitled "FACETED, TAG-BASED APPROACH FOR THE DESIGN AND COMPOSITION OF COMPONENTS AND APPLICATIONS IN COMPONENT SYSTEMS", Ser. No. 12/252,156, filed concurrently herewith, the disclosure of which is incorporated by reference herein in its entirety.

BACKGROUND OF THE INVENTION

1. Technical Field

The present invention relates to requirements engineering in information processing systems.

2. Discussion of the Related Art

In general, it is difficult to elicit formal software requirements from end-users. For example, most software requirements tend to be captured in an informal manner in an unstructured document. This makes it difficult to concisely describe the requirements, to communicate the requirements to an IT or development team precisely, and then, to verify that the requirements have indeed been met by the developed IT artifacts.

Accordingly, there is a need for a technique of eliciting formal software requirements from end-users.

SUMMARY OF THE INVENTION

In an exemplary embodiment of the present invention, a method, comprises: providing a computer menu from which a processing goal can be created, wherein the menu includes a plurality of facets, and wherein each facet includes at least one tag; receiving a processing goal, wherein the processing goal includes a plurality of tags selected from the menu; executing at least one application that includes a plurality of components arranged in a processing graph to produce information that satisfies the processing goal; and outputting the information.

A facet is a category on the computer menu that presents at least one tag associated therewith when the facet is selected.

At least one tag is a keyword associated with an available resource.

The tags are organized in a hierarchy.

The hierarchy is a directed acyclic graph.

In an exemplary embodiment of the present invention, a method, comprises: receiving a software requirement; and representing the software requirement as a plurality of processing goals described by a goal pattern, wherein the goal pattern is described by a set of tags and facets, and wherein each facet is associated with a constraint that specifies how many tags in the facet should be part of a particular processing goal.

The method further comprises developing one or more applications that satisfy the processing goals.

The software requirement comprises a high-level software requirement.

An application includes a plurality of components capable of satisfying at least one of the plurality of processing goals.

The method further comprises: initiating at least one of the applications on a computer accessible to a user; receiving a processing goal from the user, wherein the processing goal includes at least one tag selected by the user, and wherein the tag is included in a facet selected by the user; executing the at least one application to produce information that satisfies the processing goal; and providing the information to the user.

In an exemplary embodiment of the present invention, a computer readable storage medium stores instructions that, when executed by a computer, cause the computer to perform a method, the method comprising: providing a computer menu from which a processing goal can be created, wherein the menu includes a plurality of facets, and wherein each facet includes at least one tag; receiving a processing goal, wherein the processing goal includes a plurality of tags selected from the menu; executing at least one application that includes a plurality of components arranged in a processing graph to produce information that satisfies the processing goal; and outputting the information.

A facet is a category on the computer menu that presents at least one tag associated therewith when the facet is selected.

At least one tag is a keyword associated with an available resource.

The tags are organized in a hierarchy.

The hierarchy is a directed acyclic graph.

In an exemplary embodiment of the present invention, a computer readable storage medium stores instructions that, when executed by a computer, cause the computer to perform a method, the method comprising: receiving a software requirement; and representing the software requirement as a plurality of processing goals described by a goal pattern, wherein the goal pattern is described by a set of tags and facets, and wherein each facet is associated with a constraint that specifies how many tags in the facet should be part of a particular processing goal.

The method further comprises developing one or more applications that satisfy the processing goals.

The software requirement comprises a high-level software requirement.

An application includes a plurality of components capable of satisfying at least one of the plurality of processing goals.

The method further comprises: initiating at least one of the applications on a computer accessible to a user; receiving a processing goal from the user, wherein the processing goal includes at least one tag selected by the user, and wherein the tag is included in a facet selected by the user; executing the at least one application to produce information that satisfies the processing goal; and providing the information to the user.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
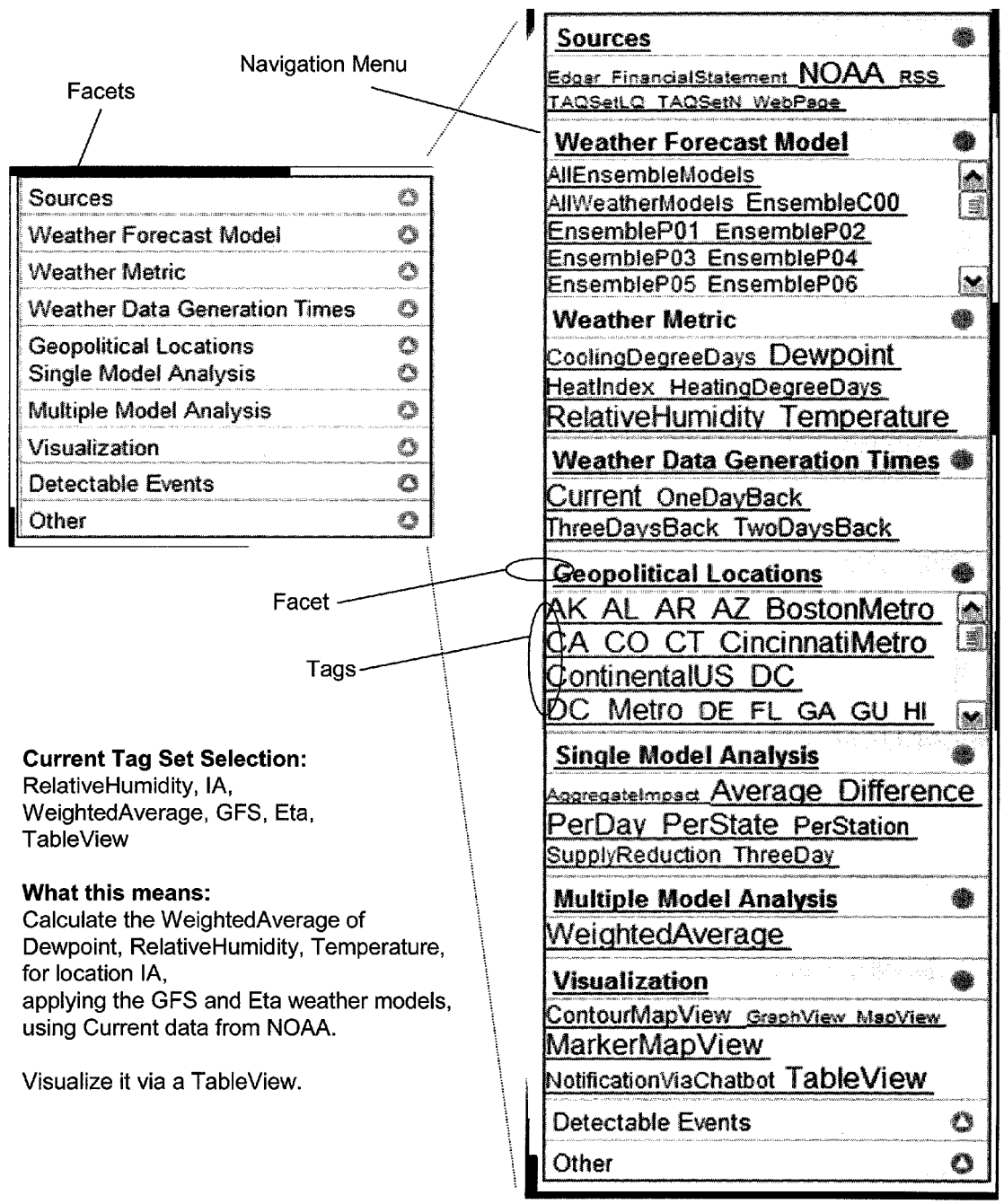
FIG. 1 shows a faceted navigation menu and a user-selected, tag-based goal, according to an exemplary embodiment of the present invention.

This disclosure incorporates by reference herein in its entirety, Bouillet et al. A tag-based approach for the design and composition of information processing applications. Object-Oriented Programming, Systems, Languages and Applications (OOPSLA) '08, to be published Oct. 19-23, 2008.

In this disclosure, we provide a novel technique for describing end-user requirements. In an exemplary embodiment, the technique utilizes faceted, tag-based functional requirements that are elicited from end-users. The facets represent different dimensions of both data and processing, where each facet is modeled as a finite set of tags that are defined in a controlled folksonomy. The faceted, tag-based functional requirements are the starting point of a top-down lifecycle where workflows and individual services are designed, explicitly keeping in mind the needs of the composition. The requirements are taken by enterprise architects who design workflow templates that are also associated with faceted, tag-based descriptions. These workflow templates can either reuse existing services of workflows, or they can be used to generate new service requirements, which are also described in terms of facets and tags. These new services are then developed by developers, and are tested individually in conjunction with other services as per the workflow templates.

In this disclosure, we focus on information processing workflows, which are workflows that retrieve and process information as desired by end-users. It is to be understood, however, that the exemplary embodiments of the present invention are not limited thereto. These workflows make available unified information, obtained or extracted from multiple data sources, in response to end-users' information inquiries. Examples of such workflows are those that obtain business intelligence for analysts and those that perform information integration and content management. The key drivers for these workflows are to facilitate better decision making by end-users and better information sharing between business operations.

In this disclosure, we focus on information processing workflows that extract data from one or more sources, process them after using one or more services, and produce useful information or knowledge. The key end-users of information processing workflows are analysts and decision makers in various enterprises. These end-users need to quickly obtain and update the business intelligence that guides their decision. For this, they need to collect the needed information from a potentially huge number of diverse sources, adapt and integrate that data, and apply a variety of analytic models, updating the results as the data changes. When new sources are discovered and/or new analytic models are developed—or simply when new ways of applying existing models are desired—users of information systems cannot and should not wait the days or months needed for development cycles to complete, to get the analysis results they urgently need. These users require the serendipitous assembly of new workflows from the available services to satisfy their dynamic and changing information processing goals.

Tags and Tag Hierarchies

The word "tag" comes from various collaborative tagging applications that have arisen in Web 2.0 (such as del.icio.us and Flickr) where users annotate different kinds of resources (like bookmarks and images) with tags. These tags aid search and retrieval of resources. A key aspect of the tagging model is that it is relatively simple, in comparison to more expressive models such as those based on Semantic Web ontologies and other formal logics. Hence, it offers a lower barrier to entry for different kinds of users to describe resources. In our case, the resources are different kinds of data artifacts, like files, input and output messages to services, etc.

Let $T=\{t_1, t_2, \ldots, t_k\}$ be the set of tags in our system. In most social tagging applications, the set of tags, T, is completely unstructured, i.e., there is no relation between individual tags. Introducing a hierarchy structure in T, however, enhances the expressivity by allowing additional tags to be inferred for resources. A tag hierarchy, H, is a directed acyclic graph (DAG) where the vertices are the tags, and the edges represent "sub-tag" relationships. It is defined as $H=(T,S)$, where T is the set of tags and $S \subseteq T \times T$ is the set of sub-tag relationships. If a tag $t_1 \in T$ is a sub-tag of $t_2 \in T$, denoted $t_1 \prec t_2$, then all resources annotated by $t_1$ can also be annotated by $t_2$. For convenience, we assume that $\forall t \in T, t \prec t$.

Facets

Facets represent dimensions for characterizing resources (data artifacts). Let $F=\{f_i\}$ be the set of facets. Each facet is a set of tags, i.e., $f_i \subseteq T$. Tags may be shared across facets.

FIG. 1 shows an example of a faceted tag cloud interface for the weather and energy trading services domain. In this domain, end-users can specify different kinds of weather forecast processing goals. Some of the facets are Sources, Weather Forecast Model, Weather Metric, etc. Each facet includes a number of tags, e.g., the Weather Metric facet includes tags like Dewpoint, Temperature, etc. It is noted that some tags are larger, indicating that they are relevant to a larger number of user-specifiable goals. End-users can select one or more tags to formulate the processing goal; our interface also provides a natural language interpretation of the goal from the set of tags, to provide feedback to the end-user on how the system interprets the goal.

Dynamic End-User Processing Goals Expressed Using Tags

As shown in FIG. 1, end-user processing goals are specified as a set of tags. For example, a commodities broker might want to watch for predicted extremes in relative humidity that might indicate a drought, indicating an opportunity to trade corn futures. He would express this as the goal GFS, Eta, RelativeHumidity, IA, WeightedAverage, ContourMapView, which represents a request for a workflow that delivers the weighted average of two relative humidity forecasts (produced using the GFS and Eta forecast models obtained from NOAA—the National Oceanographic and Atmosphere Association) for the state of Iowa presented on a contour map.

Each data artifact in our system, a is characterized by a set of tags $d(a) \subseteq T$. The data artifacts include the input and output messages of web services, RSS feeds, web pages, files, etc. The tags only describe the semantics of the data artifacts, and not the actual syntax.

End-user goals describe the semantics of the desired data artifacts that may be produced by an information processing workflow. A goal, $q \subseteq T$, is satisfied by a data artifact, a, iff $\forall t \in q \exists t' \in d(a), t' \prec t$.

Figure 2:
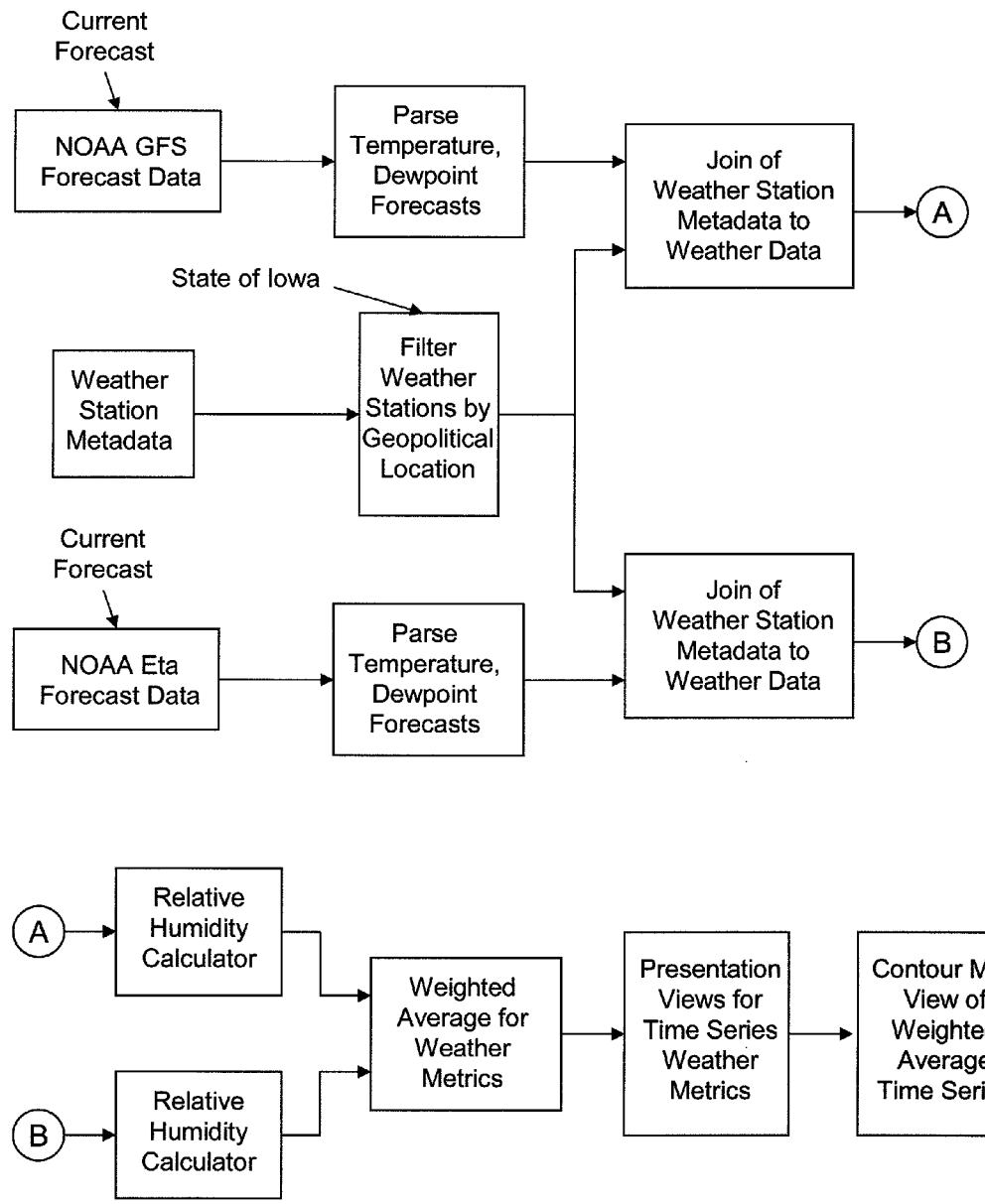
FIG. 2 shows a flow for a user-selected tag-based goal, according to an exemplary embodiment of the present invention.

When a user selects a goal, a workflow is composed in a bottom-up manner from the available services. In our system, this bottom-up composition occurs through an AI planner, such as, for example, the planner described in, [A. Riabov and Z. Liu. Planning for stream processing systems. In American Association for Artificial Intelligence (AAAI), 2005], the disclosure of which is incorporated by reference herein in its entirety, that uses tag-based descriptions of individual services to come up with a workflow satisfying the goal. FIG. 2 shows an example of such as workflow. For example, FIG. 2 is a flow example for the "IA RelativeHumidity GFS Eta WeightedAverage ContourMapView" goal. The final Contour Map View service in the workflow is a Representational State Transfer (REST) service that end-users can access for real-time result information. Some services like NOAA GFS Forecast Data are instantiated with specific configuration parameters like Current Forecast. In other words, the boxes in FIG. 2 represent components of an application.

We model a workflow as a graph $G(V, E)$ where G is a DAG (Directed Acyclic Graph). Each vertex $v \in V$ is a service instance. Each edge (u, v) represents a logical flow of messages from u to v. If a vertex, v has multiple incoming edges of the form $(u_1, v), (u_2, v), \ldots$, then it means that the output message produced by $u_1, u_2, \ldots$ are used together to create an input message to v. The message corresponding to each edge, (u, v), can be described by a set of tags, $d((u,v))$. In this disclosure, we restrict the workflows to acyclic graphs since capturing the semantics of messages where there are loops is difficult.

Overview of Potential Lifecycle Based on Faceted, Tag-Based Requirements

For this purpose, we provide a service engineering lifecycle (see FIG. 3) that is driven by high-level faceted, tag-based functional requirements. In information processing systems, the functional requirements describe the general kinds of information the end-user desires. In our approach, these functional requirements are expressed as patterns of goals that the user would like to submit. Note that this disclosure focuses on functional requirements and not non-functional requirements like security, performance and cost. However, the exemplary embodiments of the present invention are applicable to both sets of requirements.

The functional requirements are taken by an enterprise architect who comes up with a high-level design of the overall workflow(s) and of individual services. The architect first constructs one or more workflow templates that satisfy the requirements. A workflow template is a high-level description of the flow structure and is modeled as a graph of processing stages, where each stage performs a certain segment of the overall required information processing. Each stage in turn consists of a graph of service classes, where a service class is an equivalence class of services that share similar properties and are substitutable in certain contexts. The services have a modular and substitutable nature and enable composition. In addition, the decomposition of the workflow into processing stages allows reuse of both services and entire sub-flows.

The architect can reuse existing services (and service classes) in designing the workflow. In some cases, new services may need to be developed, or existing services modified, to satisfy new end-user requirements. The architect defines the semantic requirements of the new services in terms of tags describing the input and output data. In addition, the architect defines the syntactic interfaces (e.g., using WSDL) to enable its interaction with other services in the processing stage, and in the workflow in general. These semantic and syntactic service requirements are passed to a developer, who develops the service and tests it both individually and in conjunction with other services. Finally, the new services are made available for composition and deployment.

Figure 3:
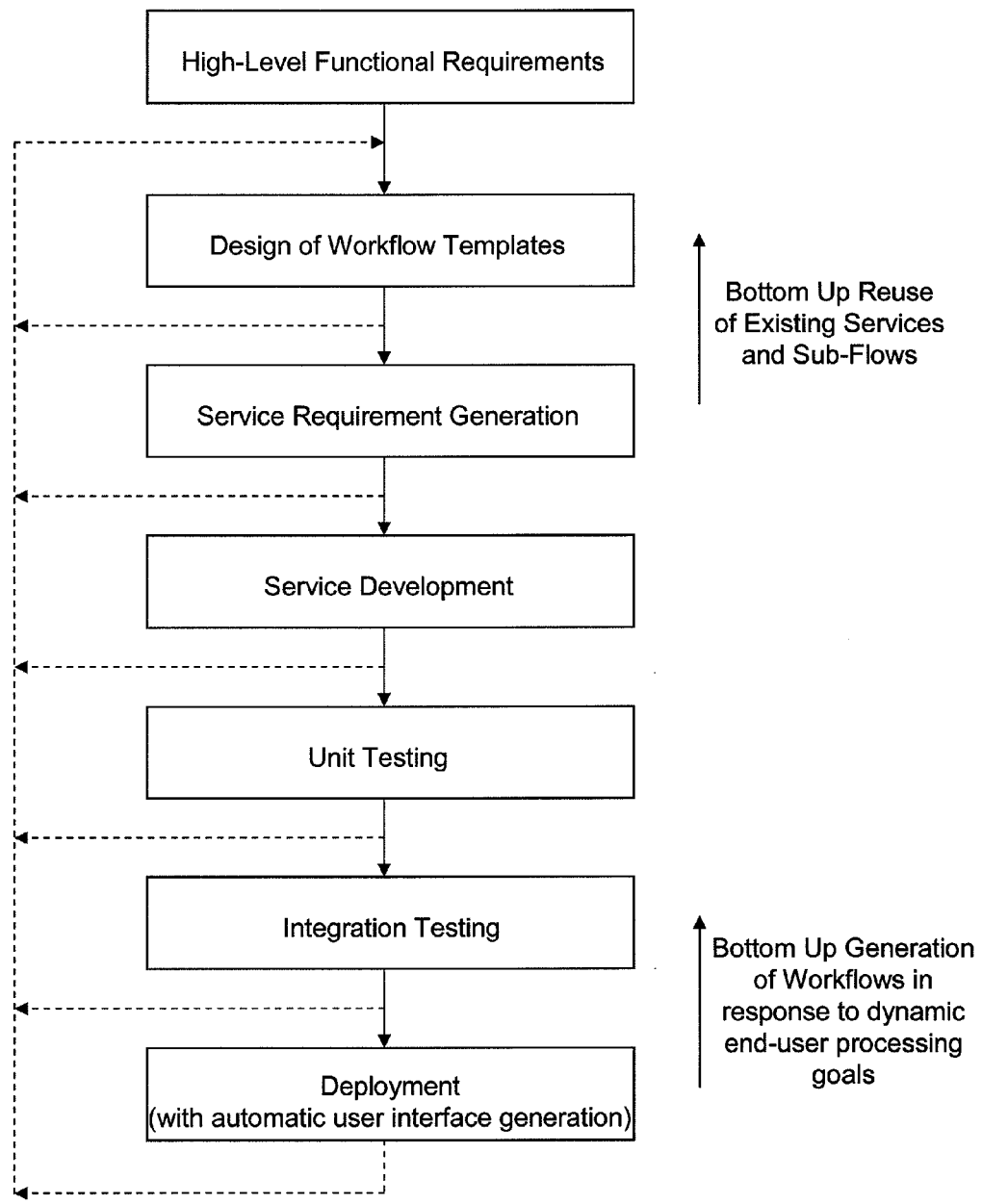
FIG. 3 shows a service development lifecycle, according to an exemplary embodiment of the present invention.

This may also result in changes to the end-user interface to include the new tags describing the outputs of workflows that contain the new service. Finally, as shown in FIG. 3, the different stages of the lifecycle are iterative, and proceed in a spiral refinement manner to finally converge towards the required system.

In summary, some notable aspects of our approach are:

1. The common, yet extensible, facets and tag hierarchies establish a simple, shared vocabulary that is used by architects, developers and end-users.

2. End-user requirements are captured in a formal manner. This enables us to verify that the requirements are actually satisfied by a set of composable services.

Faceted, Tag-Based Requirements for Driving Composition

Workflow composition requires careful design of the services. The first need is to make sure that at least those flows are composed that meet certain business requirements, which are explicitly specified by the end-users. In addition, if they satisfy new requirements through serendipitous composition of services, that is a bonus.

Hence, in our approach, high-level end-user requirements drive the service engineering process. In any large-scale information processing system, there may be a large number of different kinds of information, and a large number of different ways of processing this information. Hence, requirements are not specified in terms of single goals but as whole classes of goals that are described by goal patterns.

A goal pattern is described as a set of tags and facets. Each facet is associated with a cardinality constraint. The cardinality constraint specifies how many tags in the facet should be part of the goal.

We first define the set of cardinality constraints, CC, as the set of all ranges of positive integers. Then a goal pattern, $QP=\{(x, c) | x \in F, c \in CC\} \cup \{t | t \in T\}$. A goal pattern requirement means that end-users are interested in all data artifacts that can be described by a combination of tags that are drawn from the facets in the goal pattern, according to the cardinality constraints.

An example of a goal pattern is {Source[≥1], WeatherForecastModel[≥2], MultipleModelAnalysis[1], BasicWeatherMetric[≥1], Visualization[1]}.

This represents the class of all data artifacts that can be used to describe one or more tags that belong to the Source facet, two or more tags in the WeatherForecastModel facet, one tag in the MultipleModelAnalysis facet, one tag in the BasicWeatherMetric facet, and one tag in the Visualization facet.

A point to note is that the goal pattern can refer to a large number of possible goals. For example, if there are five tags in the Source facet, 50 tags in the Model facet, five in the MultipleModelAnalysis facet, 10 in the BasicWeatherMetric facet, and 10 in the Visualization facet, there are up to $2^5 \times 2^{50} \times 5 \times 2^{10} \times 10$ possible kinds of data that may be producible by the information processing system. The goal pattern helps in succinctly expressing the combinatorial number of possible goals that can be submitted to the system.

In this disclosure, we described the use of faceted, tag-based descriptions as a means of specifying high-level end-user requirements, in accordance with an exemplary embodiment of the present invention. The requirements kick off a top-down service development lifecycle, where enterprise architects and service developers design abstract workflow templates, generate requirements for new services, develop and test the new services and workflows, and finally make available the services for manual or automatic composition in response to dynamic user goals.

Figure 4:
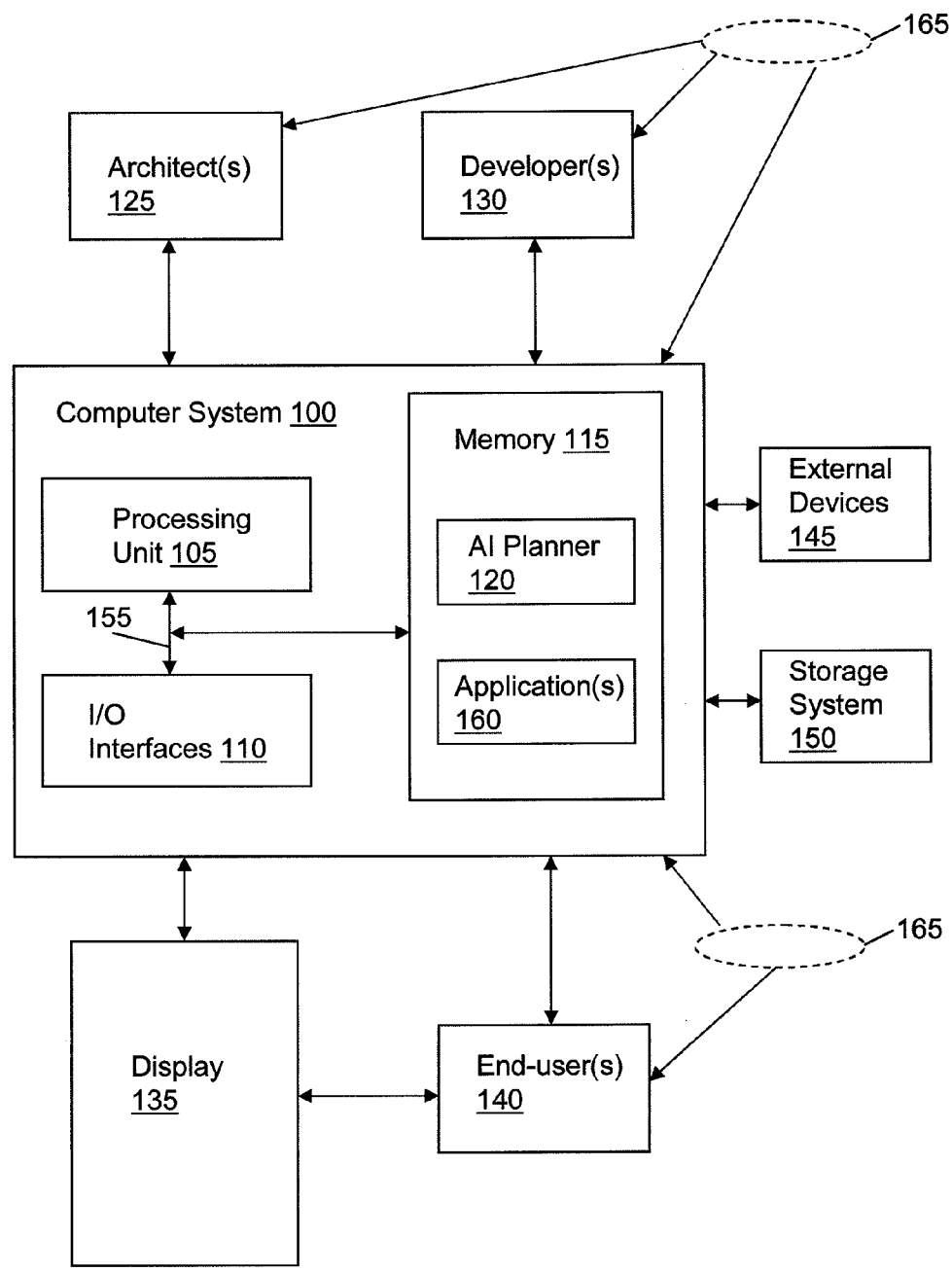
FIG. 4 shows a block diagram of a system in which exemplary embodiments of the present invention may be implemented.

A system in which exemplary embodiments of the present invention may be implemented is shown in FIG. 4. As shown in FIG. 4 the system includes a computer system 100, which can represent any type of computer system capable of carrying out the teachings of the present invention. For example, the computer system 100 can be a laptop computer, a desktop computer, a workstation, a hand-held device, a server, a cluster of computers, etc. End-user(s) 140, architect(s) 125, or developer(s) 130 can access the computer system 100 directly, or can operate a computer system that communicates with computer system 100 over a network 165 (e.g., the Internet, a wide area network (WAN), a local area network (LAN), a virtual private network (VPN), etc.).

Computer system 100 is shown including a processing unit 105, a memory 115, a bus 155, and input/output (I/O) interfaces 110. Further, computer system 100 is shown in communication with external devices/resources 145 and one or more storage system 150. In general, processing unit 105 executes computer program code, such as AI planner 120 or an application 160, that is stored in memory 115 and/or storage system 150. While executing computer program code, processing unit 105 can read and/or write data, to/from memory 115, storage system 150, and/or I/O interfaces 110. Bus 155 provides a communications link between each of the components in computer system 100. External devices/resources 145 can comprise any devices (e.g., keyboard, pointing device, display (e.g., display 135), printer, etc.) that enable a user to interact with computer system 100 and/or any devices (e.g., network card, modem, etc.) that enable computer system 100 to communicate with one or more other computing devices.

Storage system 150 can be any type of system (e.g., database) that is capable of providing storage information for use with exemplary embodiments of the present invention. Such information can include, workflow templates, services and service classes, semantic and syntactic requirements, test results, etc. Shown in memory 115 (e.g., as a computer program product) is the AI planner 120, which is used to develop workflows consisting of components configured to satisfy a user goal, and one or more application(s) 160, which represent the developed workflows, that can be executed by the end-user(s) 140, for example. The application(s) 160 can also be stored in the storage system 150.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method, comprising:
providing a computer menu from which at least one processing goal can be created, wherein the menu includes a plurality of subject facets, wherein each facet includes at least one tag associated with its subject;
receiving a plurality of processing goals as a goal pattern, wherein the goal pattern is created by selecting tags and facets from the menu and is represented as a semantic description of a first facet and a first numerical value indicating how many tags in the first facet are part of a first processing goal and a semantic description of a second facet and a second numerical value indicating how many tags in the second facet are part of the first processing goal, wherein the first facet, the first numerical value, the second facet, and the second numerical value are represented as a group of words and numbers arranged in linear sequence;
generating a workflow from the selected tags and facets of the goal pattern;
executing at least one application corresponding to the workflow, wherein the executed application includes a plurality of components arranged in a processing graph to produce information that satisfies at least one of the processing goals; and
outputting the information.

2. The method of claim 1, wherein a facet is a category on the computer menu that presents at least one tag associated therewith when the facet is selected.

3. The method of claim 2, wherein the at least one tag is a keyword associated with an available resource.

4. The method of claim 1, wherein the tags are organized in a hierarchy.

5. The method of claim 4, wherein the hierarchy is a directed acyclic graph.

6. A method, comprising:
receiving a software requirement;
representing the software requirement as a plurality of processing goals described by a goal pattern, wherein the goal pattern is represented as a semantic description of a first facet and a first numerical value that specifies how many tags in the first facet are part of a first processing goal and a semantic description of a second facet and a second numerical value indicating how many tags in the second facet are part of the first processing goal, wherein the first facet, the first numerical value, the second facet, and the second numerical value are represented as a group of words and numbers arranged in linear sequence; and
generating one or more applications based on the semantic descriptions.

7. The method of claim 6, wherein the one or more applications satisfy the processing goals.

8. The method of claim 6, wherein the software requirement comprises a high-level software requirement.

9. The method of claim 7, wherein an application includes a plurality of components capable of satisfying at least one of the plurality of processing goals.

10. The method of claim 7, further comprising:
   initiating at least one of the applications on a computer accessible to a user;
   receiving a processing goal from the user, wherein the processing goal includes at least one tag selected by the user, and wherein the tag is included in a facet selected by the user;
   executing the at least one application to produce information that satisfies the processing goal; and
   providing the information to the user.

11. A non-transitory computer readable storage medium storing instructions that, when executed by a computer, cause the computer to perform a method, the method comprising:
   providing a computer menu from which at least one processing goal can be created, wherein the menu includes a plurality of subject facets, wherein each facet includes at least one tag associated with its subject;
   receiving a plurality of processing goals, wherein the goal pattern is created by selecting tags and facets from the menu and is represented as a semantic description of a first facet and a first numerical value indicating how many tags in the first facet are part of a first processing goal and a semantic description of a second facet and a second numerical value indicating how many tags in the second facet are part of the first processing goal, wherein the first facet, the first numerical value, the second facet, and the second numerical value are represented as a group of words and numbers arranged in linear sequence;
   generating a workflow from the selected tags and facets of the goal pattern;
   executing at least one application corresponding to the workflow, wherein the executed application includes a plurality of components arranged in a processing graph to produce information that satisfies at least one of the processing goals; and
   outputting the information.

12. The computer readable storage medium of claim 11, wherein a facet is a category on the computer menu that presents at least one tag associated therewith when the facet is selected.

13. The computer readable storage medium of claim 12, wherein the at least one tag is a keyword associated with an available resource.

14. The computer readable storage medium of claim 11, wherein the tags are organized in a hierarchy.

15. The computer readable storage medium of claim 14, wherein the hierarchy is a directed acyclic graph.

16. A non-transitory computer readable storage medium storing instructions that, when executed by a computer, cause the computer to perform a method, the method comprising:
   receiving a software requirement;
   representing the software requirement as a plurality of processing goals described by a goal pattern, wherein the goal pattern is represented as a semantic description of a first facet and a first numerical value that specifies how many tags in the first facet are part of a first processing goal and a semantic description of a second facet and a second numerical value indicating how many tags in the second facet are part of the first processing goal, wherein the first facet, the first numerical value, the second facet, and the second numerical value are represented as a group of words and numbers arranged in linear sequence; and
   generating one or more applications based on the semantic descriptions.

17. The non-transitory computer readable storage medium of claim 16,
   wherein the one or more applications satisfy the processing goals.

18. The computer readable storage medium of claim 16, wherein the software requirement comprises a high-level software requirement.

19. The computer readable storage medium of claim 17, wherein an application includes a plurality of components capable of satisfying at least one of the plurality of processing goals.

20. The computer readable storage medium of claim 17, the method further comprising:
   initiating at least one of the applications on a computer accessible to a user;
   receiving a processing goal from the user, wherein the processing goal includes at least one tag selected by the user, and wherein the tag is included in a facet selected by the user;
   executing the at least one application to produce information that satisfies the processing goal; and
   providing the information to the user.

* * * * *